(12) United States Patent
Shu et al.

(10) Patent No.: US 6,598,100 B2
(45) Date of Patent: Jul. 22, 2003

(54) DVD PLAYER WITH CARD READER

(75) Inventors: Jyh-Haur Shu, Taipei (TW); Zenn Tzong Chu, Hsien (TW)

(73) Assignee: Sampo Corporation, Taipei (TW)

( * ) Notice: Subject to any disclaimer, the term of this patent is extended or adjusted under 35 U.S.C. 154(b) by 372 days.

(21) Appl. No.: 09/754,317

(22) Filed: Jan. 5, 2001

(65) Prior Publication Data

US 2002/0110073 A1 Aug. 15, 2002

(30) Foreign Application Priority Data

Dec. 27, 2000 (TW) ...................... 89222565 U

(51) Int. Cl.7 .............................................. G06F 13/00
(52) U.S. Cl. ........................... 710/62; 710/74; 710/301; 386/125
(58) Field of Search ............................... 710/1–2, 8–14, 710/36, 62–64, 72–74, 300–301; 386/124, 125, 126; 367/112

(56) References Cited

U.S. PATENT DOCUMENTS 6,367,019 B1 * 4/2002 Ansell et al. ................ 713/201
6,438,638 B1 * 8/2002 Jones et al. .................. 710/301
6,446,177 B1 * 9/2002 Tanaka et al. ............... 711/163
6,460,099 B1 * 10/2002 Stryker et al. ................. 710/74

* cited by examiner

*Primary Examiner*—Christopher B. Shin
(74) *Attorney, Agent, or Firm*—Rosenberg, Klein & Lee

(57) ABSTRACT

A DVD player with card reader of the present invention comprises a DVD player, an adapting interface and a card reader. The audio and video data, originally played by the computer, DSC or MP3 player, are accessed by a single DVD player with card reader. The audio and video data can be produced to television or audio set by the DVD player of the present invention.

5 Claims, 3 Drawing Sheets

DVD PLAYER WITH CARD READER

FIELD OF THE INVENTION

The present invention relates to a DVD player with card reader, especially to a DVD player combining information and appliance function.

BACKGROUND OF THE INVENTION

The conventional DVD player is generally used to read and playback the video data on optical disk such as DVD, VCD, CD or CD-R.

The pictures taken by a digital still camera (DSC) are generally stored on memory cards such as SM card (smart media card), MD card (mini disk card), SD card (secure digital card) or CF card (compact flash card). However, the image data stored on the memory cards can only be accessed by the DSC or with the help of desktop computer or notebook computer.

The nowadays MP3 players generally use the above-mentioned memory cards for storing MP3 data. The MP3 data is downloaded to a computer and then the data is stored on the memory card for later access of MP3 player or computer.

As above description, the audio or video data are accessed by different platforms such as computer, DSC or MP3 players. This increases the cost of consumers and does not satisfy requirement of IA fashion.

SUMMARY OF THE INVENTION

It is the object of the present invention to integrate the function of DSC and MP3 player to a DVD player. Therefore, the DVD player can read data from a memory card and output data to a television and audio set, In one aspect of the present invention, the memory card stored with image data can be accessed by a DVD player to display image on a television.

In another aspect of the present invention, the memory card stored with music data can be accessed by a DVD player to play music on a television or an audio set.

The various objects and advantages of the present invention will be more readily understood from the following detailed description when read in conjunction with the appended drawing, in which:

DETAILED DESCRIPTION OF THE INVENTION

Figure 1:
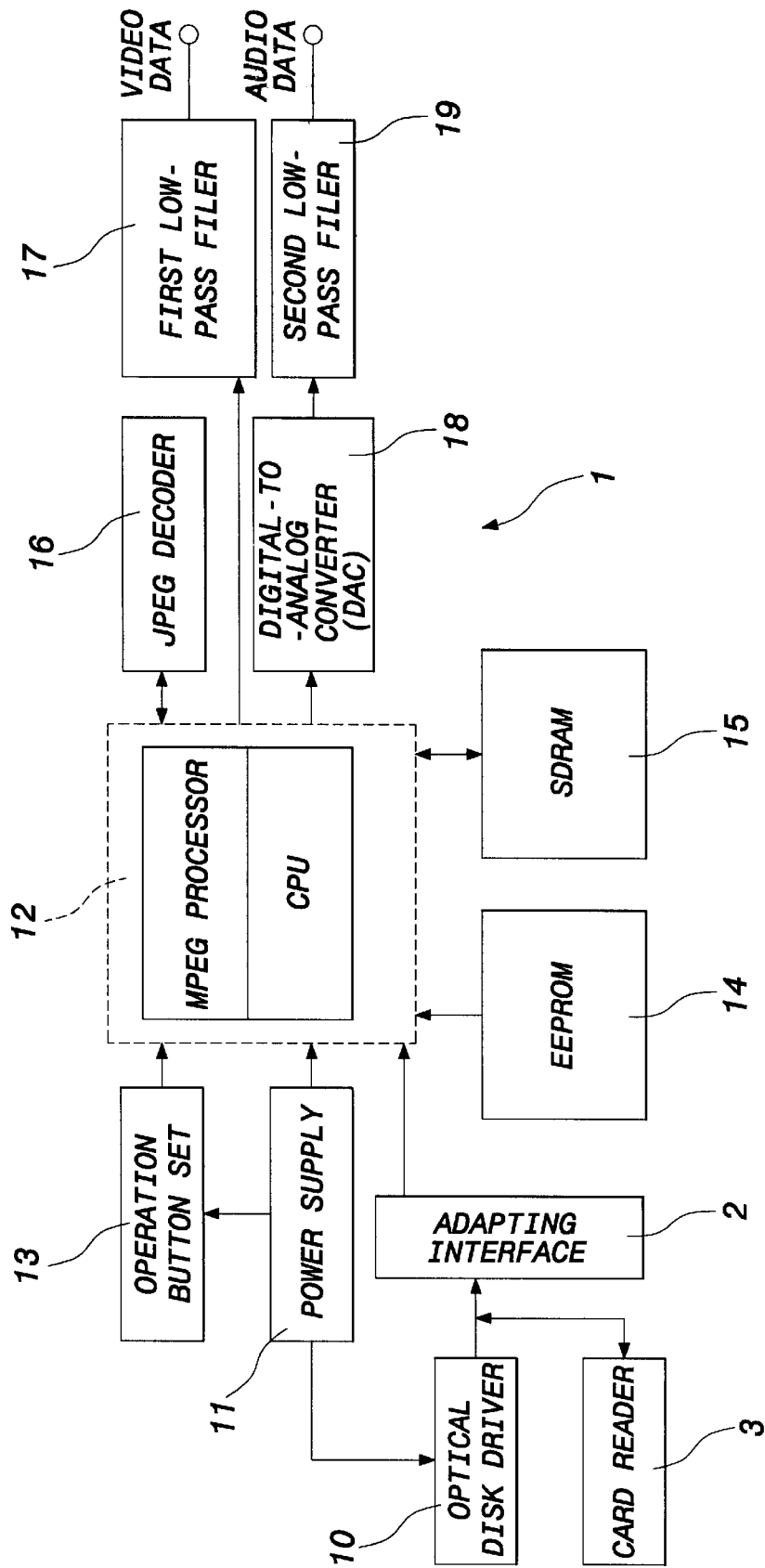
FIG. 1 is the block diagram of the first preferred embodiment of the present invention.
Figure 2:
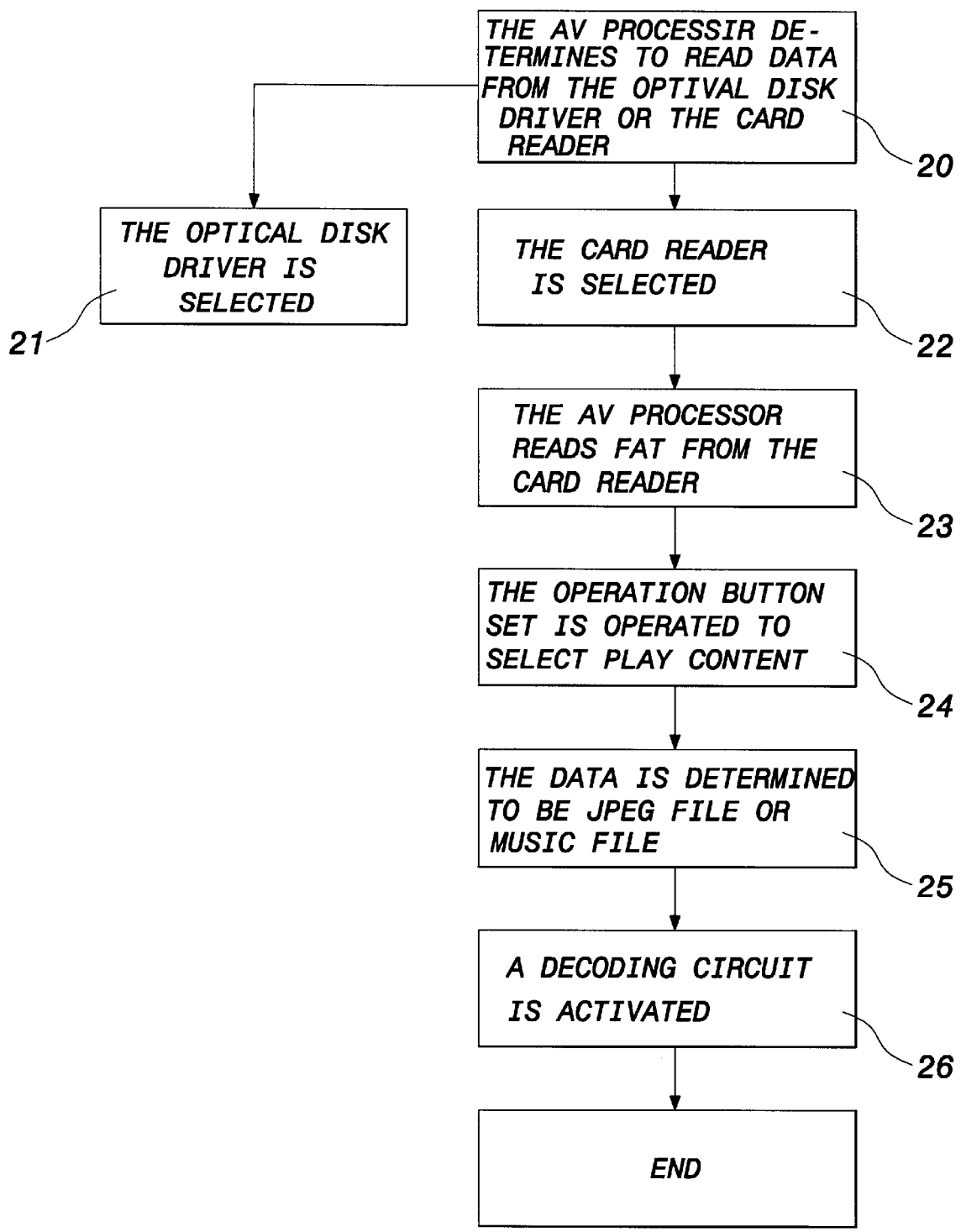
FIG. 2 shows the flowchart of the present invention.

With reference now to FIGS. 1 and 2, the present invention is intended to provide a DVD player with card reader, the preferred embodiment of the present invention comprises a DVD player 1, an adapting interface 2 and a card reader 3.

The adapting interface 2 is a CF card with build-in controller or a PCMCIA card with build-in controller. The adapting interface 2 firstly converts the data read from optical disks or memory cards to ATA format and supplies the converted data to the DVD player 1. The optical disks can be DVD, CD, VCD or CD-R. The memory cards can be CF card (compact flash card), SM card (smart media card), SD card (secure digital card), MMC (memory media card) or other flash storage media.

The optical disk driver 10 comprises a power supply 11, an AV (audio and video) processor 12, an operation button set 13, an EEPROM 14, a SDRAM 15, a JPEG decoder 16, a first low-pass filter 17, a digital-to-analog converter (DAC) 18 and a second low-pass filer 19.

The power supply 11 is used to supply electrical power to other units.

The AV processor 12 comprises a MPEG processor and a central process unit both integrated on a single chip. The AV processor 12 is connected to the optical disk driver 10 and the card reader 3 through the adapting interface 2. The optical disk driver 10 is used to access optical disk and the card reader 3 is used to access memory card with audio and video data.

The AV processor 12 reads data from the optical disk driver 10 or the card reader 3 according to an input command. The AV processor 12 determines the format of the read data by the FAT of the data and display the data. The AV processor 12 triggers a decode circuit according the data format such as image file (JPEG file) or musical file.

The operation button set 13 is arranged on a front panel of the DVD player 1 and connected to the I/O ports of the AV processor 12. The operation button set 13 has control buttons such as play, stop, prev and start etc. The AV processor 12 executes specific functions according to an input command from the operation button set 13.

The EEPROM 14 is connected to the AV processor 12 to store program.

The SDRAM 15 is connected to the AV processor 12 to store image or music data.

The input of the JPEG decoder 16 is connected to the I/O port of the AV processor 12 and used to decode the image data judged by the AV processor 12, then send the decoded data to the AV processor 12 for image output.

The first low-pass filter 17 is connected to the output of the AV processor 12 and used to filter the image from the AV processor 12 and then send the filtered data to a television.

The input of the digital-to-analog converter 18 is connected to the I/O ports of the AV processor 12, the output of the digital-to-analog converter 18 is connected to the second low-pass filer 19. The digital-to-analog converter 18 is functioned to convert the music file judged and output by the AV processor 12 to an analog representation. The second low-pass filer 19 is functioned to filter the analog representation to remove noise.

FIG. 2 shows the flowchart of the present invention. When the DVD player 1 is turned on, the AV processor 12 determines to read data from the optical disk driver or the card reader according to the input command in step 20, If the optical disk driver is selected, in step 21, the AV processor 12 reads data from the optical disk driver.

If card reader is selected in step 22, the AV processor 12 reads FAT from the card reader in step 23 and determines the data format for displaying the data content.

Afterward, the operation button set is operated to select play content in step 24. In step 25, the data is determined to be JPEG file or music file. In step 26, a decoding circuit is activated and the AV processor 12 is used to process the output data.

If the data is of image format, the JPEG decoder 16 is functioned to process the data and sent the processed data to the AV processor 12. Afterward, the image data is output through the first low-pass filter 17 to filter out noise.

If the data is of music format, the digital data is directly output, or converted by the digital-to-analog converter 18 to an analog representation. The analog representation is output through the second low-pass filer 19 for removing noise.

Figure 3:
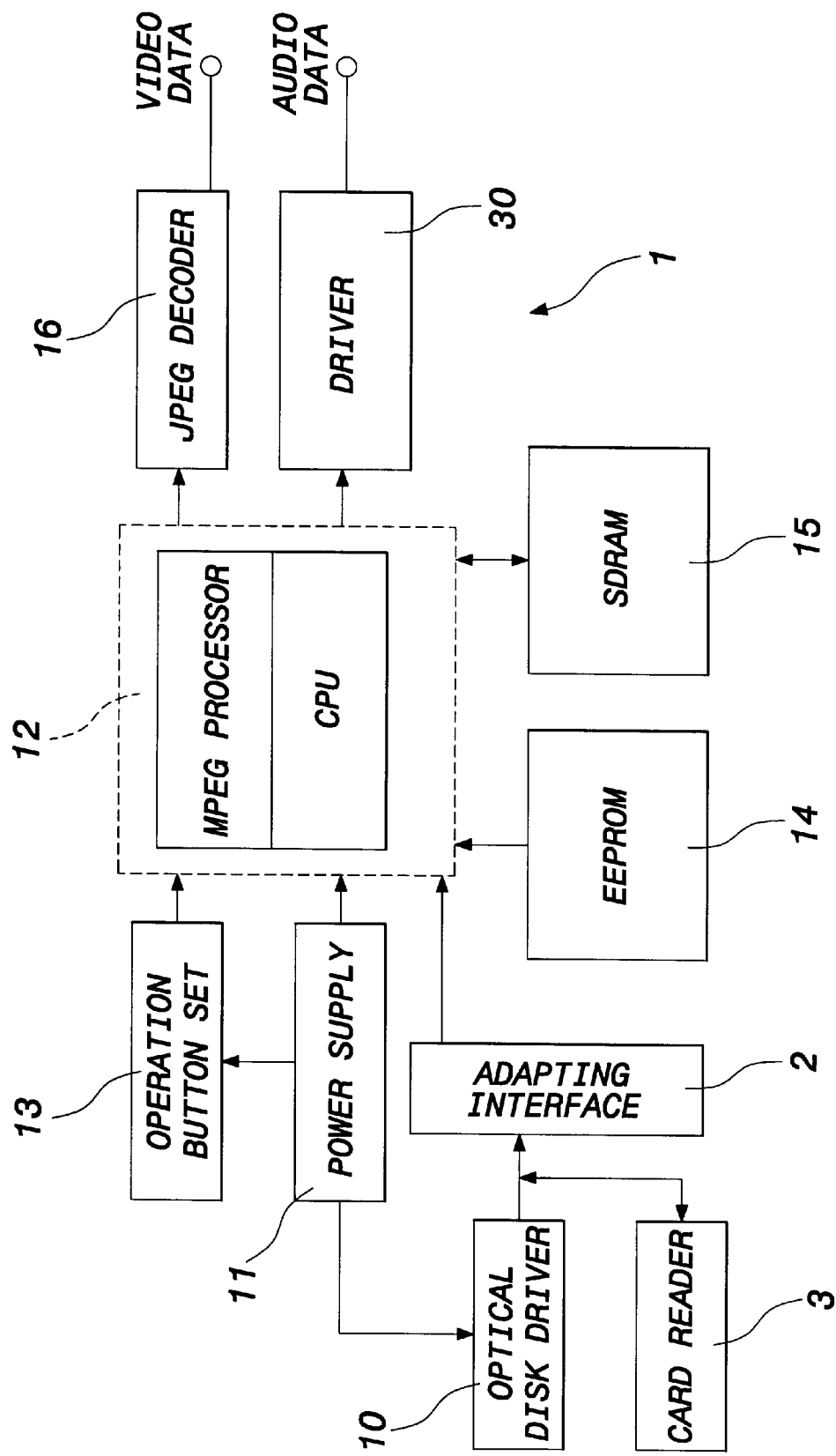
FIG. 3 is the block diagram of the second preferred embodiment of the present invention.

With reference to FIG. 3, in another preferred embodiment of the present invention, the JPEG data is directly decoded by the JPEG decoder 16 for directly outputting image data. The music data is output to audio equipment through a driver 30 to broaden the application scope of the DVD player 1.

To sum up, the present invention has following advantages:

1. The video and audio data can be read from a memory card.
2. The video and audio data can be displayed or listened through a television or an audio set.
3. The application scope of the DVD player is broadened to include DSC and MP3 player.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A DVD player with card reader, comprising
    a DVD player including therein an optical disk driver and control unit for directly reading, playing and accessing audio and video data;
    a card reader arranged in the DVD player and reading audio and video data from a memory card inserted therein;
    an adapting interface having built-in PCMCIA card with controller or a CF card with controller and connected to the control unit; the input of the adapting interface connected to the optical disk driver and the card reader to convert the data read from the optical disk driver and the card reader to ATA format such that the control unit can directly access the data or write the data to the memory card.

2. The DVD player with card reader as in claim 1, wherein the memory card can be CF card (compact flash card), SM card (smart media card), SD card (secure digital card), MMC (memory media card) or other flash storage media.

3. The DVD player with card reader as in claim 1, wherein the control unit comprises:
    a power supply used to supply electrical power to other units;
    an AV processor comprising a MPEG processor and a central process unit both integrated on a single chip;
    the AV processor reading data from the optical disk driver or the card reader according to an input command; the AV processor determining the format of the read data by the FAT of the data and display the data;
    the AV processor triggering a decode circuit according the data format such as JPEG file or musical file;
    an operation button set connected to the I/O ports of the AV processor;
    an EEPROM connected to the AV processor to store program;
    a SDRAM connected to the AV processor to store image or music data;
    a JPEG decoder connected to the I/O port of the AV processor and used to decode the JPEG data judged by the AV processor, then sending the decoded data to the AV processor for image output;
    a first low-pass filter connected to the output of the AV processor and used to filter the image from the AV processor for removing noise;
    a digital-to-analog converter connected to the I/O ports of the AV processor, and functioned to convert the music file judged and output by the AV processor to an analog representation;
    a second low-pass filer connected to the digital-to-analog converter and functioned to filter the analog representation to remove noise.

4. The DVD player with card reader as in claim 3, wherein the output port of the AV processor is connected to a driver to directly output music signal.

5. The DVD player with card reader as in claim 3, wherein the JPEG decoder is integrated into the AV processor.

* * * * *